(12) United States Patent
Ito

(10) Patent No.: US 9,151,254 B2
(45) Date of Patent: Oct. 6, 2015

(54) TORQUE INCREASE RESONATOR

(71) Applicant: AISIN SEIKI KABUSHIKI KAISHA, Kariya-shi (JP)

(72) Inventor: Atsushi Ito, Anjo (JP)

(73) Assignee: AISIN SEIKI KABUSHIKI KAISHA, Kariya-shi, Aichi-Ken (JP)

( * ) Notice: Subject to any disclaimer, the term of this patent is extended or adjusted under 35 U.S.C. 154(b) by 0 days.

(21) Appl. No.: 14/279,756

(22) Filed: May 16, 2014

(65) Prior Publication Data

US 2014/0338628 A1     Nov. 20, 2014

(30) Foreign Application Priority Data

May 16, 2013   (JP) .................................. 2013-104269

(51) Int. Cl.
*F02M 35/10*   (2006.01)
*F02B 27/00*   (2006.01)
(Continued)

(52) U.S. Cl.
CPC ........ *F02M 35/10091* (2013.01); *F02B 27/008* (2013.01); *F02B 27/021* (2013.01); *F02B 27/0242* (2013.01); *F02B 27/0263* (2013.01); *F02M 35/10026* (2013.01); *F02M 35/112* (2013.01); *F02M 35/1222* (2013.01); *F02M 35/1233* (2013.01); *F02M 35/1255* (2013.01); *F02M 35/1261* (2013.01); *Y02T 10/146* (2013.01)

(58) Field of Classification Search
CPC .......... F02M 35/1255; F02M 35/1261; F02M 35/10026; F01N 1/02; F01N 1/023; F01N 13/02; F02B 27/0252; F02B 27/008; F02B 27/0263; F23R 2900/00014; F23R 2900/00013

USPC ............. 123/184.55, 184.24, 184.57, 184.53; 181/249–251
See application file for complete search history.

(56) References Cited

U.S. PATENT DOCUMENTS 3,990,418 A * 11/1976 Nohira et al. ............ 123/568.31
4,538,556 A *  9/1985 Takeda ...................... 123/184.57
(Continued)

FOREIGN PATENT DOCUMENTS

DE    38 20 607 A1   12/1988
DE    42 15 416 A1   11/1993
(Continued)

OTHER PUBLICATIONS

Extended European Search Report dated Aug. 13, 2014, issued by the European Patent Office in corresponding European Patent Application No. 14168220.3-1606. (8 pages).

*Primary Examiner* — Marguerite McMahon
*Assistant Examiner* — James Kim
(74) *Attorney, Agent, or Firm* — Buchanan Ingersoll & Rooney PC

(57) ABSTRACT

A torque increase resonator includes: a plurality of resonance pipes that extend outward from an intake passage supplying air to an internal combustion engine; one resonance chamber that is formed so that end portions of extending portions of the plurality of resonance pipes are positioned in an internal space of the resonance chamber; and a valve that opens and closes an opening of the extending portion of at least one resonance pipe of the plurality of resonance pipes, wherein the intake passage and the resonance chamber communicate with each other through the plurality of resonance pipes, and the plurality of resonance pipes are close to each other, and are disposed on a downstream side of a throttle in a flow direction of air in the intake passage.

12 Claims, 4 Drawing Sheets

(51) Int. Cl.
*F02M 35/112* (2006.01)
*F02B 27/02* (2006.01)
*F02M 35/12* (2006.01)

(56) References Cited

U.S. PATENT DOCUMENTS

| | | | |
|---|---|---|---|
| 4,546,733 A * | 10/1985 | Fukami et al. | 123/184.57 |
| 6,267,092 B1 | 7/2001 | Matsumoto et al. | |
| 6,422,192 B1 * | 7/2002 | Bloomer | 123/184.57 |
| 6,467,494 B1 * | 10/2002 | Kolb et al. | 137/12 |
| 7,077,093 B2 * | 7/2006 | Koelmel et al. | 123/184.57 |
| 8,727,070 B2 * | 5/2014 | Huber et al. | 181/250 |
| 2003/0226541 A1 | 12/2003 | Hamamoto | |
| 2003/0230273 A1 | 12/2003 | Koelmel et al. | |
| 2005/0199439 A1 * | 9/2005 | Goenka et al. | 181/250 |
| 2009/0031981 A1 * | 2/2009 | Osumi | 123/184.57 |

FOREIGN PATENT DOCUMENTS

| | | |
|---|---|---|
| DE | 102 17 760 A1 | 11/2003 |
| EP | 0 569 714 A1 | 11/1993 |
| EP | 1 362 997 A2 | 11/2003 |
| JP | 60-017226 A | 1/1985 |
| JP | 03-089975 U | 9/1991 |
| JP | 03-110115 U | 11/1991 |
| JP | 07-293377 A | 11/1995 |
| JP | 2001-050127 A | 2/2001 |
| JP | 2001-123902 A | 5/2001 |
| JP | 2011-241787 A | 12/2011 |

* cited by examiner

TORQUE INCREASE RESONATOR

CROSS REFERENCE TO RELATED APPLICATIONS

This application is based on and claims priority under 35 U.S.C. §119 to Japanese Patent Application 2013-104269, filed on May 16, 2013, the entire contents of which are incorporated herein by reference.

TECHNICAL FIELD

This disclosure relates to a torque increase resonator that is mounted on an internal combustion engine and can change a resonant frequency.

BACKGROUND DISCUSSION

In general, it is preferable that engine torque (hereinafter, referred to as torque) of an internal combustion engine (hereinafter, referred to as an engine) be as constant (flat) as possible regardless of a speed. However, the torque of the engine is actually changed according to a speed. In the past, a torque increase resonator (hereinafter, referred to as a resonator) has been used to make the torque characteristics of the engine be as flat as possible. The resonator is an additional device that increases torque by improving the suction efficiency of air sucked into a combustion chamber through the amplification of pulsation of air (intake pulsation) that is generated as air flowing through an intake passage of the engine is sucked into the combustion chamber. The resonator amplifies intake pulsation by using Helmholtz resonance. When the frequency of intake pulsation (hereinafter, referred to as pulsation frequency) corresponds to the resonant frequency of the resonator, intake pulsation is increased and torque is increased.

Since pulsation frequency is changed according to an engine speed, the resonator is adapted so that resonance occurs at a desired engine speed (pulsation frequency) where torque is to be increased. However, as a frequency deviates from the resonant frequency in the resonator, torque is reduced. Accordingly, when the range of a speed where torque is to be increased is wide, a variable resonator switching a plurality of resonant frequencies is used.

JP 2011-241787A (Reference 1) discloses a resonator that is provided in a surge tank supplying intake air to an engine and includes a volume unit, a communication unit, and a resonant frequency switching unit. The communication unit connects the surge tank to the volume unit, and includes a communication passage that allows a tank chamber to communicate with a volume chamber. The resonant frequency switching unit switches a resonant frequency of the resonator into a first predetermined frequency and a second predetermined frequency by rotating a variable-volume partition plate according to an opening of a throttle and the speed of an engine by an actuator so as to change the volume of the volume chamber, the cross-sectional area of the communication passage, and the length of the communication passage.

JP 2001-123902A (Reference 2) discloses a resonator that includes a partition plate provided in a box body so as to be divided from a surge tank, a communication hole communicating with the surge tank and formed in the partition plate, and a movable plate including a plurality of communication pipes and rotated by an actuator. In the resonator, the movable plate is rotated according to drive conditions of an engine so that one of the plurality of communication pipes is matched to the communication hole. Accordingly, the surge tank and the resonator communicate with each other and a resonant frequency is changed.

Since the resonator has a function of amplifying intake pulsation in an intake manifold, a resonance pipe or a resonance chamber of the resonator requires strength that does not allow deformation even though strong pulsation is applied to the resonance pipe or the resonance chamber and high airtightness that retains pressure of intake pulsation. Further, in a variable resonator, for the significant change of a resonant frequency of the resonator, it is necessary to significantly change one of the volume of the resonance chamber, the length of the resonance pipe, and the diameter of the resonance pipe or to simultaneously change two or three of them.

In JP 2011-241787A (Reference 1), all of the volume of the volume chamber, the cross-sectional area of the communication passage, and the length of the communication passage are significantly changed when a first fan-shaped partition plate and a second fan-shaped partition plate are rotated in directions opposite to each other together with the rotation of the variable-volume partition plate. For this reason, there is a concern that the structure of the resonator becomes complicated and increases in size. Furthermore, since the actuator rotating the variable-volume partition plate is positioned outside the volume chamber, a shaft (a rotating shaft of the actuator) on which the variable-volume partition plate or the first and second fan-shaped partition plates are mounted is disposed so as to pass through the volume chamber from the outside toward the inside. For this reason, there has been a problem in that it is difficult to ensure high airtightness even though, for example, a seal is provided.

In JP 2001-123902A (Reference 2), the actuator is provided in the resonator. However, in order to obtain a desired resonant frequency, airtightness should be ensured between the movable plate and the communication hole and a flow passage of air between the surge tank and the resonator should be formed by only the communication hole and the communication pipe. For this purpose, although not specified in JP 2001-123902A (Reference 2), for example, a seal made of rubber or the like needs to be provided on the outer periphery of an opening of the communication hole facing the resonator and the movable plate needs to be rotated while coming into contact with the seal. For this reason, there have been problems in that a frictional force caused by the contact between the movable plate and the seal is always generated during the rotation of the movable plate and an actuator having a large output is needed to smoothly rotate the movable plate. Further, even though the actuator having a large output can be used, there has been a problem in that the seal wears out with the rotation of the movable plate and airtightness deteriorates.

SUMMARY

Thus, a need exists for a torque increase resonator which is not suspectable to the drawback mentioned above.

An aspect of this disclosure is directed to a torque increase resonator including a plurality of resonance pipes that extend outward from an intake passage supplying air to an internal combustion engine, one resonance chamber that is formed so that end portions of extending portions of the plurality of resonance pipes are positioned in an internal space of the resonance chamber, and a valve that opens and closes an opening of the extending portion of at least one resonance pipe of the plurality of resonance pipes. The intake passage and the resonance chamber communicate with each other through the plurality of resonance pipes. The plurality of resonance pipes are close to each other, and are disposed on a downstream side of a throttle in a flow direction of air in the intake passage.

In general, the resonant frequency of the resonator is proportional to the square root of the cross-sectional area of the passage of the resonance pipe and the resonator resonates at a higher frequency as the cross-sectional area of the passage is larger. For this reason, when a plurality of resonant frequencies were requested in the past, resonance pipes having the cross-sectional areas of the passages corresponding to the respective resonant frequencies were individually provided as in the resonator disclosed in JP 2001-123902A (Reference 2). Now, the inventor of this disclosure has found that a resonant frequency, which is obtained when a plurality of resonance pipes are disposed close to each other and all of the resonance pipes communicate with each other, is equal to a resonant frequency that is obtained when one resonance pipe having the cross-sectional area of the passage equal to a total cross-sectional area of the passages of the plurality of resonance pipes is provided.

When a plurality of resonance pipes are disposed close to each other as in this configuration, it is possible to set the maximum opening area, which is obtained when the resonance pipes are fully opened to obtain, for example, particularly required intake pulsation, and to easily set a state where different kinds of intake pulsation are obtained by making some resonance pipes communicate with each other. Accordingly, since it is possible to easily obtain plural kinds of intake pulsation that are amplified by resonance, it is possible to efficiently supply combustion air to a combustion chamber of the internal combustion engine.

In addition, since the end portions of the extending portions of the plurality of resonance pipes are positioned in the internal space of the resonance chamber, the resonance chamber can be installed close to the intake passage while the required length of the resonance pipe is ensured. Accordingly, it is possible to obtain the resonator of which the entire size is compact and which is excellent in the degree of freedom in installation.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

1. First Embodiment

Structure of Intake System Including Torque Increase Resonator

Figure 1:
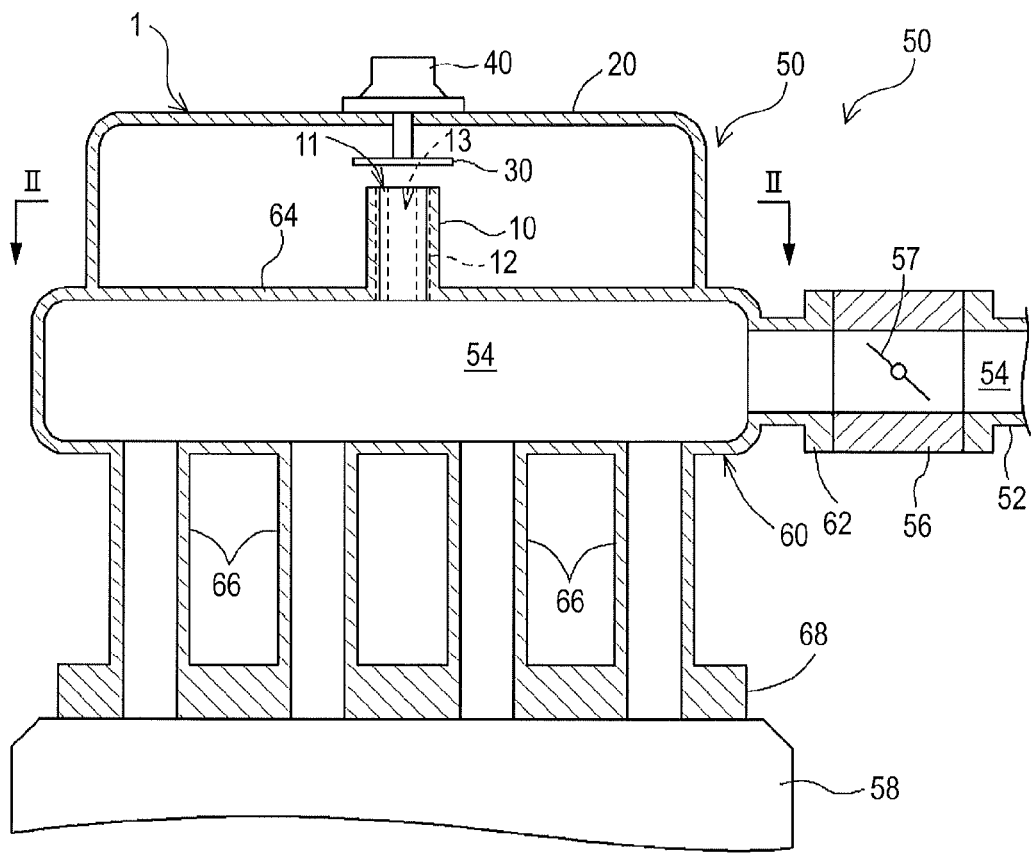
FIG. 1 is a cross-sectional view showing the schematic structure of an intake system that includes a torque increase resonator according to a first embodiment.

A first embodiment disclosed here will be described in detail below with reference to the drawings. As shown in FIG. 1, an intake system 51 of a four-cylinder engine (hereinafter, simply referred to as an engine) 50 as an internal combustion engine includes an intake pipe 52, a throttle body 56, an intake manifold 60, and a torque increase resonator (hereinafter, referred to as a resonator) 1.

The intake pipe 52 is formed in the shape of a cylinder including an opening, and includes an intake passage 54 that allows air to be supplied to a combustion chamber 58 to flow therein. The throttle body 56 is provided on the downstream side of the intake pipe 52 in the flow direction of air, and is airtightly connected to the intake pipe 52. The throttle body 56 includes a throttle 57 that adjusts the flow rate of air flowing through the intake passage 54. The intake manifold 60 is provided on the downstream side of the throttle body 56 in the flow direction of air, and a suction portion 62 of the intake manifold 60 and the throttle body 56 are airtightly connected to each other.

The intake manifold 60 includes the above-mentioned suction portion 62, a surge tank 64 that is connected to the suction portion 62, four ports 66 that are branched from the surge tank 64, and a flange 68 that is formed at end portions of the ports 66 opposite to the surge tank 64 and is connected to the combustion chamber 58. The main function of the intake manifold 60 is to evenly distribute air, which has flowed through the intake passage 54, to the respective cylinders. Air is sucked into the combustion chamber 58 through the intake manifold 60 by negative pressure that is generated in the combustion chamber 58 in a suction stroke of a piston (not shown) of the engine 50. That is, air flows through the suction portion 62, the surge tank 64, and the ports 66. The suction portion 62, the surge tank 64, and the ports 66 are included in the intake passage 54. The intake manifold 60 is integrally made of a synthetic resin. For example, a material, which is obtained by mixing glass fiber with a polyamide resin (PA6), is used as the synthetic resin in consideration of strength, weight, moldability, and the like.

Figure 2:
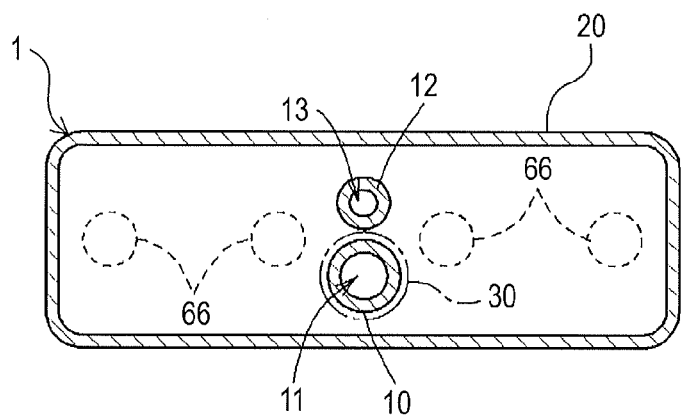
FIG. 2 is a cross-sectional view taken along line II-II of FIG. 1.

As shown in FIGS. 1 and 2, the resonator 1 is formed on one side of the surge tank 64 opposite to the side where the ports 66 are formed. The resonator 1 includes a first resonance pipe 10 which is formed in a cylindrical shape and of which the cross-sectional area of a passage is large, a second resonance pipe 12 which is formed in a cylindrical shape and of which the cross-sectional area of a passage is small, one resonance chamber 20, a valve 30, and a negative pressure actuator 40. The first and second resonance pipes 10 and 12 are examples of a resonance pipe. The cross-sectional area of the passage of the first resonance pipe 10 is about three times of the cross-sectional area of the passage of the second resonance pipe 12. The first and second resonance pipes 10 and 12 extend outward from the wall surface of the surge tank 64 so that the axes of the first and second resonance pipes 10 and 12 are parallel to each other. A first opening 11 and a second opening 13, which are end faces of the first and second resonance pipes 10 and 12 opposite to the surge tank 64, are positioned in an internal space of the resonance chamber 20. The length of the first resonance pipe 10 is the same as the length of the second resonance pipe 12. The resonator 1 is made of the same polyamide resin as the material of the intake manifold 60, and a part of the walls forming the resonance chamber 20 is shared with walls of the surge tank 64. The resonance chamber 20 communicates with the surge tank 64 through the first and second resonance pipes 10 and 12. Meanwhile, the first opening 11 is an example of an opening.

The first and second resonance pipes 10 and 12 extend from the wall surface of the surge tank 64, and are formed so that the end portions of the extending portions of the respective resonance pipes are positioned in the internal space of the resonance chamber 20. For this reason, the resonance chamber 20 can be installed close to the surge tank 64, which is the intake passage 54, while the required lengths of the first and second resonance pipes 10 and 12 are ensured. Accordingly, it is possible to obtain the resonator of which the entire size is compact and which is excellent in the degree of freedom in installation.

Further, as shown in FIG. 1, the resonance chamber 20 is disposed on one side of the surge tank 64 opposite to the combustion chamber 58. Accordingly, intake pulsation, which has been amplified by the resonance of the resonator 1, is directly transmitted to the combustion chamber 58 through the ports 66, so that the efficiency of the intake of air into the combustion chamber 58 can be improved and engine torque can be increased. Furthermore, since the first and second resonance pipes 10 and 12 protrude toward the resonance chamber 20, the length of the valve 30 to protrude from the negative pressure actuator 40 to the end portions of the first and second resonance pipes 10 and 12 is shortened. Accordingly, the vibration or the like of a support portion of the valve 30 is not easily generated, so that the operation of the valve 30 is stable. Moreover, the structure of the negative pressure actuator 40 becomes more compact.

When viewed along line II-II of FIG. 1, the first and second resonance pipes 10 and 12 are disposed between the ports 66 and 66 positioned in the middle and are close to each other as shown in FIG. 2. "Close to each other" means that the shortest distance between the outer peripheral surface of the first resonance pipe 10 and the outer peripheral surface of the second resonance pipe 12 is equal to or smaller than the outer diameter of the second resonance pipe 12. Further, the axes of the respective first and second resonance pipes 10 and 12 are parallel to the axes of the respective ports 66, and the distances between the axes of the respective first and second resonance pipes 10 and 12 and the axes of the respective ports 66 are equal to each other. Accordingly, when both the first and second resonance pipes 10 and 12 are opened, the waveform of the intake pulsation amplified at the time of resonance can be transmitted to the combustion chamber 58 through the each port 66 as it is without being distorted.

Figure 3:
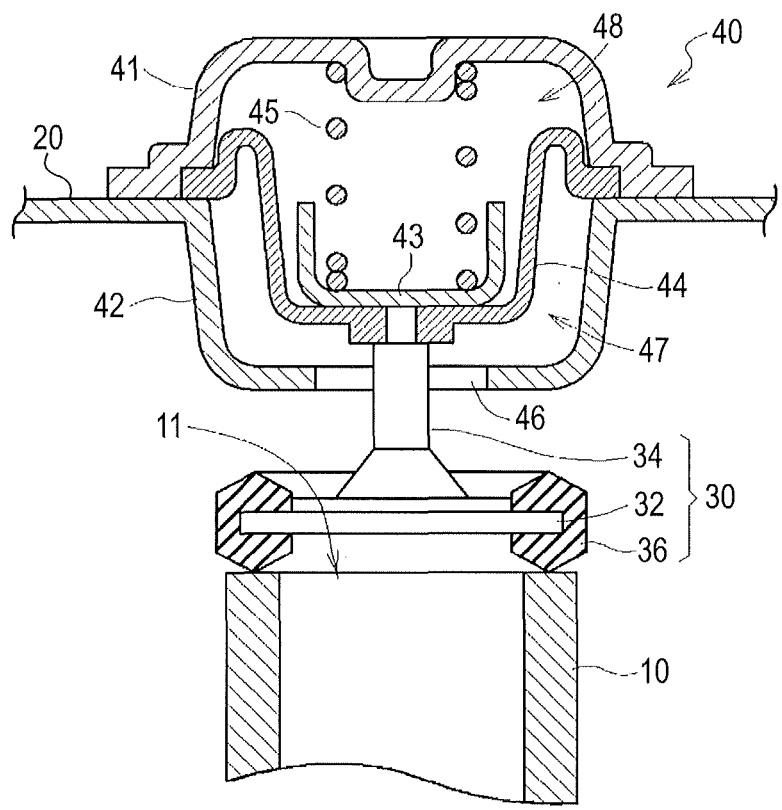
FIG. 3 is a cross-sectional view showing the schematic structure of a negative pressure actuator.

The valve 30 is an openable and closable valve that cuts off the communication between the resonance chamber 20 and the surge tank 64, between which the first resonance pipe 10 is interposed, by closing the first opening 11. The valve 30 is driven by the negative pressure actuator 40. The valve 30 moves in the direction of an axis of the first resonance pipe 10. As shown in FIG. 3, the valve 30 includes a disc-shaped lid 32, an operation rod 34 that protrudes in a direction perpendicular to the lid 32, and a seal 36 that is fitted to the outer periphery of the lid 32 and is formed of an elastic member made of rubber or the like. The operation rod 34 is joined to a pressure plate 43 of the negative pressure actuator 40. The valve 30 moves in synchronization with the movement of the pressure plate 43. When the valve 30 is in a closed state, the seal 36 comes into contact with the outer periphery of the first opening 11, seals the first opening 11, and cuts off the flow of the air in the first resonance pipe 10. Meanwhile, the seal 36 is an example of an elastic member.

The valve 30 is provided in the resonance chamber 20 in this embodiment. However, since engine torque can be increased without being reduced when the valve 30 is provided in the resonance chamber 20, the resonance chamber 20 is most preferable as a position at which the valve 30 is disposed. If the valve 30 is installed in the first resonance pipe 10, a resonance effect is lowered due to a pressure loss in the internal passage of the first resonance pipe 10. Further, if the valve 30 is installed in the surge tank 64, a pressure loss in the intake passage 54 is increased when the valve is opened. The reduction of engine torque is caused even in any case.

The negative pressure actuator 40 includes an upper case 41, a lower case 42, the pressure plate 43, a diaphragm 44, and a spring 45. The lower case 42 is formed integrally with the wall of the resonance chamber 20, protrudes toward the internal space of the resonance chamber 20, and includes a through hole 46 that is formed at the center thereof. The inner diameter of the through hole 46 is sufficiently larger than the outer diameter of the operation rod 34, and the operation rod 34 passes through the through hole 46. The upper case 41 is joined to the lower case 42 by a method, such as welding, so that the airtightness between the upper case 41 and the lower case 42 is maintained. If the lower case 42 is not formed integrally with the wall of the resonance chamber 20, the upper case 41 and the lower case 42 need to be joined to each other and the lower case 42 and the wall of the resonance chamber 20 also need to be joined to each other. Accordingly, assembly man-hours are required and a risk that airtightness cannot be maintained and air may leak becomes high.

The outer peripheral end of the diaphragm 44 is held by the upper case 41 and the lower case 42, so that a negative pressure chamber 48 is formed by the upper case 41 and the diaphragm 44 and an atmospheric pressure chamber 47 is formed by the lower case 42 and the diaphragm 44. Airtightness is maintained between the negative pressure chamber 48 and the atmospheric pressure chamber 47. Since the atmospheric pressure chamber 47 and the resonance chamber 20 communicate with each other through the through hole 46, the same internal pressure is always applied to the diaphragm 44 and the valve 30 that are positioned in the resonance chamber 20. Further, since a total projected area of a portion of the diaphragm 44 facing the valve 30 is equal to a total projected area of a portion of the valve 30 facing the diaphragm 44, a force, which presses the diaphragm 44 and the valve 30 and is caused by the internal pressure of the resonance chamber 20, becomes constant. Accordingly, even though the change of internal pressure caused by intake pulsation occurs in the resonance chamber 20, the valve 30 can stably maintain a closed state without a malfunction. Meanwhile, the diaphragm 44 is formed of a thin elastic member made of rubber or the like, and has a shape where a central portion of the diaphragm 44 is movable in a vertical direction of FIG. 3.

Since the pressure plate 43 is mounted in the negative pressure chamber 48 so as to come into contact with the diaphragm 44, the pressure plate 43 is integrated with the diaphragm 44 and moves in the vertical direction. The spring 45 is mounted between the pressure plate 43 and the upper case 41, and biases the pressure plate 43 (diaphragm 44) to the lower side by a biasing force thereof.

Since the operation rod 34 is joined to the pressure plate 43 as described above, the valve 30 protrudes downward by the biasing force of the spring 45 so as to come into contact with the outer periphery of the first opening 11 and is in a closed state when the internal pressure of the negative pressure chamber 48 is equal to the internal pressure of the atmospheric pressure chamber 47 (resonance chamber 20). Further, when the internal pressure of the negative pressure chamber 48 is made lower than the internal pressure of the resonance chamber 20 by a vacuum pump (not shown), a force, which is obtained by multiplying the area of the diaphragm 44 by a difference between the internal pressure of the resonance chamber 20 and the internal pressure of the negative pressure chamber 48, is applied to the diaphragm 44. Furthermore, when an upward force applied to the diaphragm 44 is larger than the biasing force of the spring 45, the diaphragm 44 moves upward. As a result, the valve 30 (seal 36) is also separated from the outer periphery of the first opening 11. When the upward force applied to the diaphragm 44 is further increased, the valve 30 is in an open state while the seal 36 comes into contact with the lower case 42 and seals the diaphragm 44. If the seal 36 comes into contact with the lower case 42 and seals the diaphragm 44 when the valve 30 is in an open state, the change of internal pressure caused by intake pulsation in the resonance chamber 20 is cut off by the seal 36 and is not transmitted to the diaphragm 44. Accordingly, it is possible to protect the diaphragm 44 from the change of internal pressure. Therefore, it is possible to achieve both the sealing of the first opening 11 at the time of closing of the valve and the sealing of the diaphragm 44 at the time of opening of the valve, by only the seal 36.

Operation of Torque Increase Resonator

In general, when the length of the resonance pipe is constant, the resonant frequency of the resonator is proportional to the square root of the cross-sectional area of the passage and the resonator resonates at a higher engine speed as the cross-sectional area of the passage is larger. For this reason, when a plurality of resonant frequencies were requested in the past, exclusive resonance pipes having the cross-sectional areas of the passages corresponding to the respective resonant frequencies were individually provided as in the resonator disclosed in JP 2001-123902A (Reference 2). Now, the inventor of this disclosure has found that a resonant frequency, which is obtained when a plurality of resonance pipes are disposed close to each other and all of the resonance pipes communicate with each other, is equal to a resonant frequency that is obtained when one resonance pipe having the cross-sectional area of the passage equal to a total cross-sectional area of the passages of the plurality of resonance pipes is provided. For example, one resonance pipe having the cross-sectional area of a passage, which generates a low resonant frequency, and one resonance pipe having the cross-sectional area of a passage, which is set so that a total cross-sectional area of the passages of two resonance pipes generates a high resonant frequency, are provided to obtain two resonant frequencies by the two resonance pipes. It is considered that the reason for this is to prevent the waves of the intake pulsation caused by resonance from adversely affecting each other when a plurality of resonance pipes are disposed close to each other. According to this structure, it is possible to obtain the same resonant frequency as the resonant frequency, which is obtained by a resonance pipe having a large cross-sectional area of a passage, by combining a plurality of resonance pipes having a small cross-sectional area of a passage.

Figure 4:
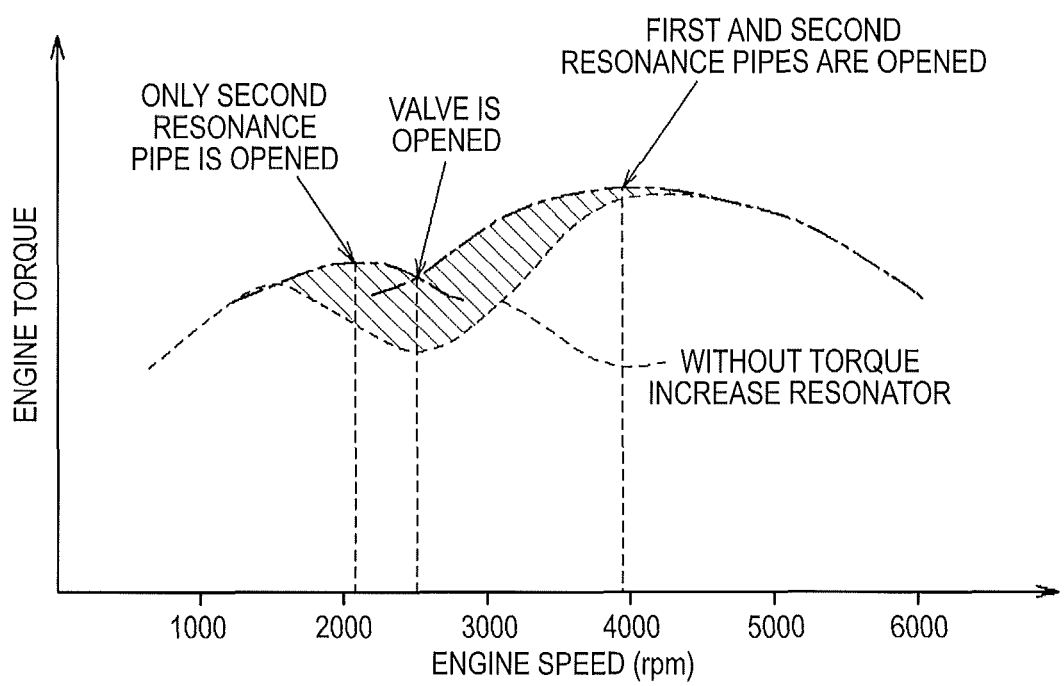
FIG. 4 is a graph showing a relationship between engine speed and engine torque when the torque increase resonator is used.

As shown by a dotted line of FIG. 4, in an engine 50 that does not includes the resonator 1, the intake system 51 of the engine 50 mounted on the vehicle includes the intake passage 54 that are formed by a cool air duct and an air cleaner (which are not shown), the intake pipe 52, the throttle 57, the surge tank 64, and the ports 66 from the upstream. For this reason, a two-peak torque curve including a low engine speed-side torque peak (a range of 1500 rpm in FIG. 4), which is generated by a resonant frequency caused by air-column vibration in the entire intake passage 54, and a high engine speed-side torque peak (a range of 4500 rpm in FIG. 4), which is generated by an inertia supercharging effect caused by the intake pipe 52 and the ports 66, is obtained. Accordingly, a valley of torque between the two peaks particularly becomes a problem.

When the speed of the engine 50 is low, the first resonance pipe 10 is closed by the valve 30 and only the second resonance pipe 12 is opened in the resonator 1 according to this embodiment. In this case, in comparison with the case in which the resonator 1 is not provided, even though engine speed exceeds the range of 1500 rpm, engine torque continues to increase and becomes maximum when the speed of the engine 50 is in the range of 2000 rpm. The reason for this is that a resonant frequency is generated in the range of 2000 rpm corresponding to the cross-sectional area of the passage of the second resonance pipe 12 and intake pulsation is increased, so that the suction efficiency of air sucked into the combustion chamber 58 is improved. However, since a frequency deviates from the resonant frequency when the speed of the engine 50 becomes higher than 2000 rpm, engine torque is gradually reduced.

Further, when the speed of the engine is close to 2500 rpm, the valve 30 is opened and the first resonance pipe 10 is also opened. Accordingly, a resonant frequency is switched and the resonator resonates again at the speed of the engine 50, which corresponds to a total cross-sectional area of the passages of the cross-sectional area of the passage of the first resonance pipe 10 and the cross-sectional area of the passage of the second resonance pipe 12, so that intake pulsation is increased. Specifically, since the cross-sectional area of the passage of the first resonance pipe 10 is about three times the cross-sectional area of the passage of the second resonance pipe 12, a total cross-sectional area of the passages of the cross-sectional area of the passage of the first resonance pipe 10 and the cross-sectional area of the passage of the second resonance pipe 12 becomes four times the cross-sectional area of the passage of the second resonance pipe 12 when the first resonance pipe 10 is opened. When a total cross-sectional area of the passages of the cross-sectional area of the passage of the first resonance pipe 10 and the cross-sectional area of the passage of the second resonance pipe 12 becomes four times the cross-sectional area of the passage of the second resonance pipe 12, a resonant frequency becomes two times, that is, the resonator resonates at 4000 rpm. Accordingly, engine torque changes to increase toward 4000 rpm again, and reaches a maximum again in the range of 4000 rpm.

As described above, the resonator 1 according to this embodiment includes the first and second resonance pipes 10 and 12 and the resonance chamber 20, and changes the resonant frequency of the resonator 1 by changing the number of resonance pipes, which communicate with each other, through the opening or closing of the valve 30. That is, a movable unit of the resonator 1 is only the valve 30. For this reason, the movable unit can be made very compact as compared to a resonator of JP 2011-241787A (Reference 1) rotating a variable-volume partition plate or a resonator of JP 2001-123902A (Reference 2) rotating a movable plate, so that the pressure receiving area of the movable unit is reduced. Since pressure applied to the movable unit is also significantly changed in the resonator 1 by intake pulsation, the movable unit having a small pressure receiving area is not easily affected by intake pulsation and can be stably operated. Further, the valve 30 moves linearly in a direction perpendicular to the end face of the first resonance pipe 10. For this reason, it is possible to drive the valve 30 by the negative pressure actuator 40 that operates linearly without the change of the movement direction thereof. Accordingly, since links, bearings, and the like are not necessary, it is possible to reduce the number of parts and costs. Furthermore, since the pressure receiving area of the valve 30 is small in the resonator 1, it is possible to reduce the size, weight, and costs of the negative pressure actuator 40.

The valve 30 has been provided in only the first resonance pipe 10 in this embodiment. However, this disclosure is not limited thereto, and the valve 30 may be provided in only the second resonance pipe 12. Further, the valve 30 may be provided in each of both the first and second resonance pipes 10 and 12. If the valves 30 of the first and second resonance pipes 10 and 12 are adapted to be opened and closed independently of each other, it is possible to set three kinds of cross-sectional areas of passages, that is, a case in which only the first resonance pipe 10 is opened, a case in which only the second resonance pipe 12 is opened, and a case in which both the first and second resonance pipes 10 and 12 are opened. Accordingly, since it is possible to set three kinds of resonant frequencies, it is possible to obtain a high-torque engine 50 of which the valley of engine torque is low.

Two resonance pipes have been used in this embodiment. However, this disclosure is not limited thereto, and it goes without saying that three or more resonance pipes may be used. Further, the valve 30 can be provided in each of arbitrary resonance pipes (single or plural) of three or more resonance pipes. Accordingly, it is possible to increase engine torque at a desired engine speed. Furthermore, if a plurality of resonance pipes are to be simultaneously opened or closed, one resonance pipe may not be provided with one negative pressure actuator 40 and a plurality of resonance pipes may be adapted to be opened or closed by one negative pressure actuator 40.

The cross-sectional areas of the passages of the first and second resonance pipes 10 and 12 have been different from each other in this embodiment, but this disclosure is not limited thereto. It goes without saying that the cross-sectional areas of the passages of the first and second resonance pipes 10 and 12 may be equal to each other if a high resonant frequency of two kinds of desired resonant frequencies is 1.4 times of a low resonant frequency thereof.

The first and second resonance pipes 10 and 12 have protruded from the surge tank 64 in this embodiment, but this disclosure is not limited thereto. If the first and second resonance pipes 10 and 12 are present on the downstream side of the throttle 57 in the flow direction of air, the first and second resonance pipes 10 and 12 may be provided on the upstream side of the surge tank 64.

The negative pressure actuator 40 has been used to open and close the valve 30 in this embodiment, but this disclosure is not limited thereto. An electric linear actuator or the like may be used to open and close the valve 30.

2. Second Embodiment

A second embodiment disclosed here will be described in detail below with reference to the drawings. The position of a resonance chamber 20 of this embodiment is different from the position of the resonance chamber 20 of the first embodiment, and other structures of this embodiment are the same as those of the first embodiment. Accordingly, in the description of this embodiment, the same portions as the portions of the first embodiment will be denoted by the same reference numerals and the description thereof will be omitted.

Figure 5:
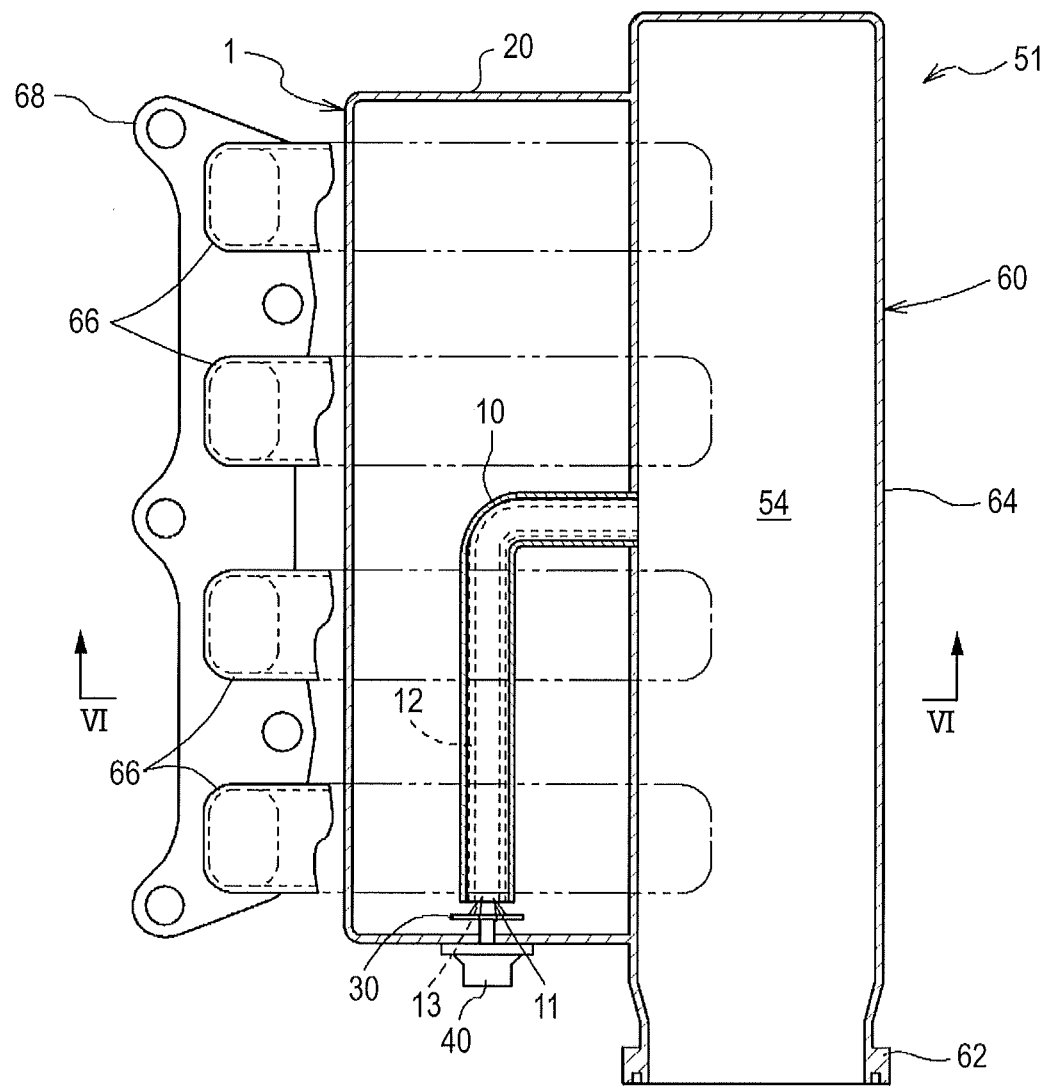
FIG. 5 is a cross-sectional view showing the schematic structure of an intake system that includes a torque increase resonator according to a second embodiment.
Figure 6:
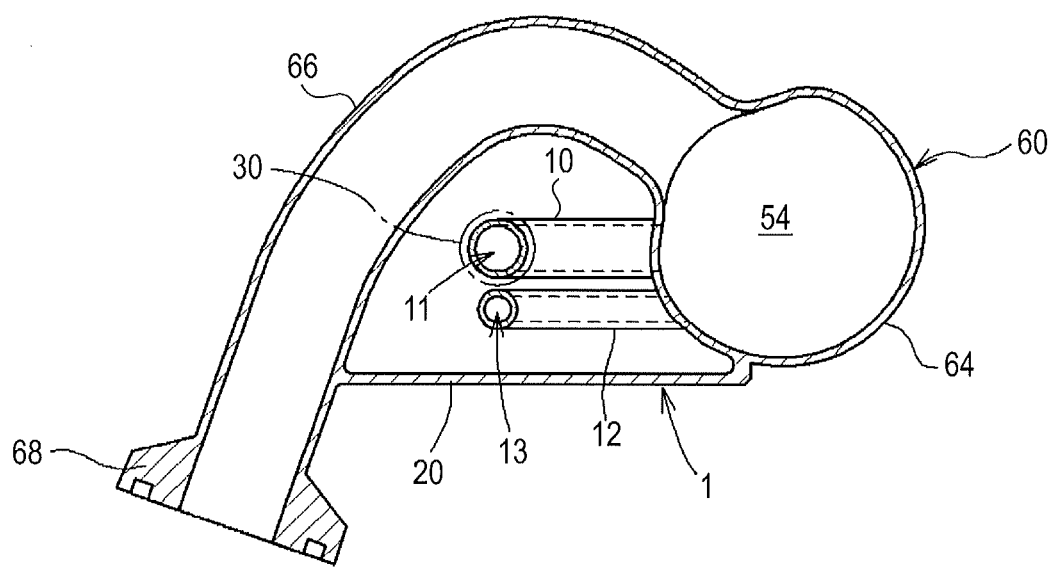
FIG. 6 is a cross-sectional view taken along line VI-VI of FIG. 5.

As shown in FIGS. 5 and 6, in this embodiment, passages of four ports 66 of an intake manifold 60 are divided into four passages therein, but outer walls of the four ports are connected to each other. Further, the ports 66 extend from a surge tank 64 in a U shape. The resonance chamber 20 of the resonator 1 is formed by a wall of the surge tank 64 and walls that are formed by the connection of the ports 66. It is possible to effectively utilize a dead space by forming the resonance chamber 20 in this way.

The first and second resonance pipes 10 and 12 have extended from the wall of the surge tank 64, but have extended in an L shape unlike in the first embodiment.

The operation, function, and effect of the resonator 1 according to this embodiment are the same as those of the first embodiment. Further, structures that can be applied to the first embodiment can also be applied to this embodiment.

This disclosure can be used for a torque increase resonator that is mounted on an internal combustion engine and can change a resonant frequency.

An aspect of this disclosure is directed to a torque increase resonator including a plurality of resonance pipes that extend outward from an intake passage supplying air to an internal combustion engine, one resonance chamber that is formed so that end portions of extending portions of the plurality of resonance pipes are positioned in an internal space of the resonance chamber, and a valve that opens and closes an opening of the extending portion of at least one resonance pipe of the plurality of resonance pipes. The intake passage and the resonance chamber communicate with each other through the plurality of resonance pipes. The plurality of resonance pipes are close to each other, and are disposed on a downstream side of a throttle in a flow direction of air in the intake passage.

In general, the resonant frequency of the resonator is proportional to the square root of the cross-sectional area of the passage of the resonance pipe and the resonator resonates at a higher frequency as the cross-sectional area of the passage is larger. For this reason, when a plurality of resonant frequencies were requested in the past, resonance pipes having the cross-sectional areas of the passages corresponding to the respective resonant frequencies were individually provided as in the resonator disclosed in JP 2001-123902A (Reference 2). Now, the inventor of this disclosure has found that a resonant frequency, which is obtained when a plurality of resonance pipes are disposed close to each other and all of the resonance pipes communicate with each other, is equal to a resonant frequency that is obtained when one resonance pipe having the cross-sectional area of the passage equal to a total cross-sectional area of the passages of the plurality of resonance pipes is provided.

When a plurality of resonance pipes are disposed close to each other as in this configuration, it is possible to set the maximum opening area, which is obtained when the resonance pipes are fully opened to obtain, for example, particularly required intake pulsation, and to easily set a state where different kinds of intake pulsation are obtained by making some resonance pipes communicate with each other. Accordingly, since it is possible to easily obtain plural kinds of intake pulsation that are amplified by resonance, it is possible to efficiently supply combustion air to a combustion chamber of the internal combustion engine.

In addition, since the end portions of the extending portions of the plurality of resonance pipes are positioned in the internal space of the resonance chamber, the resonance chamber can be installed close to the intake passage while the required length of the resonance pipe is ensured. Accordingly, it is possible to obtain the resonator of which the entire size is compact and which is excellent in the degree of freedom in installation.

In the torque increase resonator according to the aspect of this disclosure, it is preferable that the plurality of resonance pipes are disposed in a surge tank of an intake manifold.

According to this configuration, it is possible to directly transmit intake pulsation, which is amplified when the resonator resonates, to the combustion chamber of the internal combustion engine through ports. Accordingly, the efficiency of the intake of air into the combustion chamber can be improved and engine torque can be increased.

In the torque increase resonator according to the aspect of this disclosure, it is preferable that the number of the resonance pipes is two and the resonance pipes are disposed so that distances between each of the resonance pipes and all of a plurality of ports of the intake manifold are equal to one another.

According to this configuration, when both the two resonance pipes are opened, the waveform of the intake pulsation amplified at the time of resonance can be transmitted to the combustion chamber of the internal combustion engine as it is without being distorted.

In the torque increase resonator according to the aspect of this disclosure, it is preferable that lengths of the plurality of resonance pipes are equal to one another.

According to this configuration, a resonant frequency, which is obtained when the plurality of resonance pipes are disposed close to each other and all of the resonance pipes communicate with each other, can be set so as to be equal to a resonant frequency that is obtained when one resonance pipe having the cross-sectional area of the passage equal to a total cross-sectional area of the passages of the plurality of resonance pipes is provided. Accordingly, exclusive resonance pipes having the cross-sectional area of a passage corresponding to a desired resonant frequency do not need to be individually provided and it is possible to obtain the same resonant frequency as the resonant frequency, which is obtained by a resonance pipe having a large cross-sectional area of a passage, by combining a plurality of resonance pipes having a small cross-sectional area of a passage.

In the torque increase resonator according to the aspect of this disclosure, it is preferable that a cross-sectional area of a passage of at least one resonance pipe of the plurality of resonance pipes is different from cross-sectional areas of passages of the other resonance pipes.

According to this configuration, it is possible to obtain a resonator having a plurality of resonant frequencies that cannot be realized by the combination of a plurality of resonance pipes having the same cross-sectional area of a passage.

In the torque increase resonator according to the aspect of this disclosure, it is preferable that the valve is provided in each of the plurality of resonance pipes and the respective valves are independently openable and closable.

According to this configuration, even though two resonance pipes are provided, it is possible to set three kinds of cross-sectional areas of a passage. Accordingly, it is also possible to set three kinds of resonant frequencies, and to obtain a high-torque internal combustion engine of which the valley of torque is low.

In the torque increase resonator according to the aspect of this disclosure, it is preferable that the valve is opened and closed by a negative pressure actuator, the negative pressure actuator includes a diaphragm, the valve and an atmosphere-side of the diaphragm are provided in the resonance chamber, and pressure receiving areas of the valve and the diaphragm, which receive pressure in a direction in which the valve is opened and closed, are equal to each other.

Since the diaphragm and the valve are positioned in the resonance chamber, the same internal pressure is always applied to the diaphragm and the valve. Further, the pressure receiving areas of the valve and the diaphragm, which receive pressure in a direction in which the valve is opened and closed, are equal to each other. For this reason, since forces, which are applied to the diaphragm and the valve in the resonance chamber, are always equal to each other, the valve can stably maintain a closed state without being opened even though the change of internal pressure caused by intake pulsation occurs in the resonance chamber.

In the torque increase resonator according to the aspect of this disclosure, it is preferable that the valve includes an elastic member on the entire circumference thereof, the negative pressure actuator further includes a lower case, the elastic member comes into contact with the resonance pipe and seals the resonance pipe when the valve is closed, and the elastic member comes into contact with the lower case and seals the diaphragm when the valve is opened.

If the elastic member comes into contact with the lower case and seals the diaphragm when the valve is in an open state, the change of internal pressure caused by intake pulsation in the resonance chamber is cut off by the elastic member and is not transmitted to the diaphragm. Accordingly, it is possible to protect the diaphragm from the change of internal pressure. Therefore, it is possible to achieve both sealing when the valve is closed and sealing when the valve is opened by one elastic member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A torque increase resonator comprising:
    a plurality of resonance pipes that extend outward from an intake passage supplying air to an internal combustion engine;
    one resonance chamber that is formed so that end portions of extending portions of the plurality of resonance pipes are positioned in an internal space of the resonance chamber; and
    a valve that opens and closes an opening of the extending portion of at least one resonance pipe of the plurality of resonance pipes,
    wherein the intake passage and the resonance chamber communicate through the plurality of resonance pipes,
    the plurality of resonance pipes are close to each other, and are disposed on a downstream side of a throttle in a flow direction of air in the intake passage, the plurality of resonance pipes are disposed in a surge tank of an intake manifold, the intake manifold comprising a plurality of ports,
    the plurality of resonance pipes comprising a first resonance pipe possessing a center axis and a second resonance pipe possessing a center axis, and
    the plurality of ports of the intake manifold are disposed so that a distance from one of the plurality of ports to the center axis of the first resonance pipe equals a distance from the one port to the center axis of the second resonance pipe.

2. The torque increase resonator according to claim 1, wherein lengths of the plurality of resonance pipes are equal to one another.

3. The torque increase resonator according to claim 1, wherein a cross-sectional area of a passage of at least one resonance pipe of the plurality of resonance pipes is different from cross-sectional areas of passages of the other resonance pipes.

4. The torque increase resonator according to claim 1, wherein the valve is provided in each of the plurality of resonance pipes, and the respective valves are independently openable and closable.

5. The torque increase resonator according to claim 1, wherein the valve is opened and closed by a negative pressure actuator, the negative pressure actuator includes a diaphragm, the valve and an atmosphere-side of the diaphragm communicate with the resonance chamber, and pressure receiving areas of the valve and the diaphragm, which receive pressure in a direction in which the valve is opened and closed, are equal to each other.

6. The torque increase resonator according to claim 5, wherein the valve includes an elastic member on the entire circumference thereof, the negative pressure actuator further includes a lower case, the elastic member comes into contact with the resonance pipe and seals the resonance pipe when the valve is closed, and the elastic member comes into contact with the lower case and seals the diaphragm when the valve is opened.

7. A torque increase resonator comprising:

a plurality of resonance pipes that extend outward from an intake passage positioned to supply air to an internal combustion engine, the plurality of resonance pipes comprising extending portions;

a resonance chamber possessing an internal space in which are positioned end portions of the extending portions of the plurality of resonance pipes, the extending portion of at least one of the resonance pipes possessing an opening;

a valve configured to open and close the opening of the extending portion of the at least one resonance pipe;

the intake passage being arranged to communicate with the resonance chamber through the plurality of resonance pipes;

the plurality of resonance pipes being disposed in a surge tank of an intake manifold on a downstream side of a throttle in a flow direction of air in the intake passage, the intake manifold comprising at least a first port and a second port;

the plurality of resonance pipes comprising a first resonance pipe possessing a center axis and a second resonance pipe possessing a center axis;

the first port of the intake manifold being positioned so that a distance from the first port to the center axis of the first resonance pipe equals a distance from the first port to the center axis of the second resonance pipe; and the second port of the intake manifold is positioned so that a distance from the second port to the center axis of the first resonance pipe equals a distance from the second port to the center axis of the second resonance pipe.

8. The torque increase resonator according to claim 7, wherein lengths of the plurality of resonance pipes are equal to one another.

9. The torque increase resonator according to claim 7, wherein a cross-sectional area of a passage of the one resonance pipe of the plurality of resonance pipes is different from cross-sectional area of the second resonance pipe.

10. The torque increase resonator according to claim 7, where in each of the resonance pipes includes an opening that is opened and closed by a respective valve, the respective valves being independently openable and closable.

11. The torque increase resonator according to claim 7, wherein the valve is opened and closed by a negative pressure actuator, the negative pressure actuator includes a diaphragm, the valve and an atmosphere-side of the diaphragm communicate with the resonance chamber, and pressure receiving areas of the valve and the diaphragm, which receive pressure in a direction in which the valve is opened and closed, are equal to each other.

12. The torque increase resonator according to claim 11, wherein:

the valve comprises a lid possessing an outer circumference and an elastic member encircling an entirety of the outer circumference of the lid, the negative pressure actuator comprises a lower case, the elastic member contacts the resonance pipe and seals the resonance pipe when the valve is closed, and the elastic member contacts the lower case and seals the diaphragm when the valve is opened.

* * * * *